Oct. 29, 1935.   S. G. TILDEN   2,018,688
FRICTION TESTER
Filed July 15, 1932
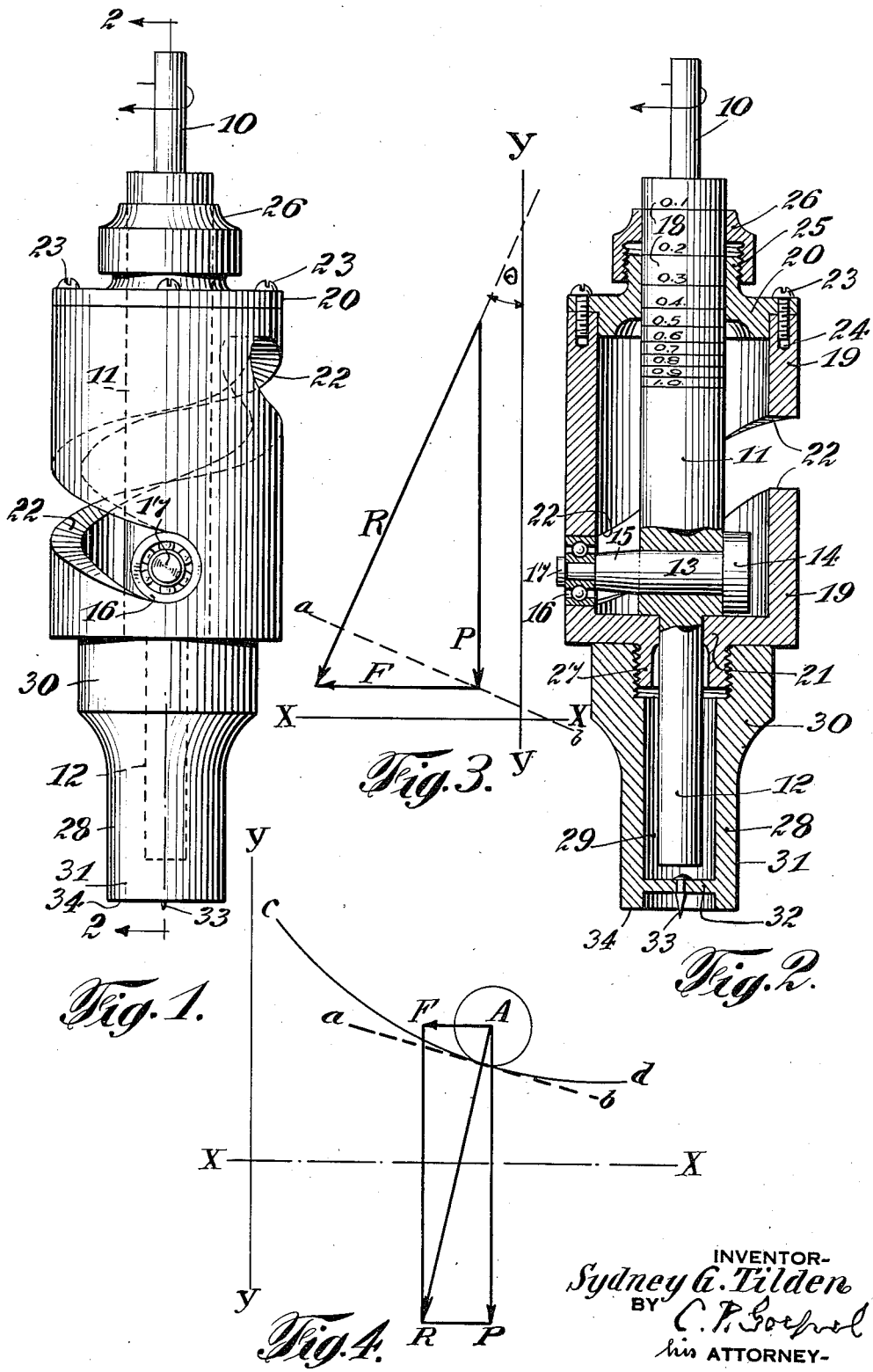

Patented Oct. 29, 1935

2,018,688

UNITED STATES PATENT OFFICE 2,018,688

FRICTION TESTER

Sydney G. Tilden, Stewart Manor, Long Island, N. Y., assignor to Raybestos-Manhattan, Inc., Passaic, N. J., a corporation of New Jersey Application July 15, 1932, Serial No. 622,704

16 Claims. (Cl. 265—10)

This invention relates to a friction tester.

It has for its object to provide an accurate device for determining the co-efficient of friction between two materials. For this purpose, it is essential to recognize that the co-efficient of friction, hereinafter denoted as $\mu$, between two materials is the ratio of force required to move one surface over another at uniform velocity, hereinafter denoted as F, to the total force pressing both surfaces together, hereinafter denoted as P.

$$\mu \text{ equals } \frac{F}{P}$$

For this purpose, my invention comprises a device which has a surface in contact with the material to be tested, which surface is moved in respect thereto, and indicator means showing the co-efficient of friction of the contact surface of the device and the material tested. The friction of the material being tested is indicative of its resistance to movement, rotational or translational, and so surfaces may be tested and frictional value and usefulness determined, by ascertaining immediately and accurately and without further calculation their co-efficients of friction, which may be read directly by the indicating means.

The invention in its preferred embodiment also includes a driven member disposed in contact with a surface being tested, the movement of the driven member being opposed because of the resistance offered by the surface being tested. There are also included, a driving member for actuating the driven member subjected to the force of application and pressing the surface of the driven member against the surface being tested, and to the force necessary to maintain a uniform velocity of the driven member on the surface being tested, and means for indicating the direction of the resultant of the said total force pressing the two said surfaces together, and said uniform velocity force.

In particular, visual inspection of brake linings is not sufficient to determine whether they are of satisfactory frictional value for the particular brake to which the lining is applied, and no direct manner has been known to test their frictional value unless the linings are taken out in their entirety and subjected to test in their entirety. Such brake lining tests depend, however, upon measuring individually the force of application and the force necessary to maintain uniform velocity, and are elaborate and expensive, and in the service field cannot be used to readily answer the inquiry as to whether the brake lining already in use on a car is of improper frictional value and should be renewed. In the use of this invention in the service and maintenance fields, it is only necessary to remove the wheel and brake drum and apply the device to the surface of the brake linings, and the owner of the car can readily satisfy himself, by his own readings of the indicator, whether or not there is any necessity of renewing the brake linings.

The invention will be more fully described and shown in the drawing, and finally pointed out in the claims.

In the accompanying drawing,

Figure 1 is a side view, with cover removed, of a device for testing the co-efficient of friction of materials, embodying my invention;

Figure 2 is a central longitudinal section of the same looking on line 2—2 of Fig. 1;

Figure 3 is a diagram of forces in which the relation of the forces necessary to maintain uniform velocity (F) to the force of application (P) and the direction of the resultant (R) is shown for a certain value of the co-efficient of friction ($\mu$); and Figure 4 is a diagram of the cam follower and a portion of the cam showing the roller aligned so that the resultant (R) acts radially on the center of the roller with no components to cause the roller to move sidewise along the cam.

Similar reference characters designate similar parts throughout the drawing.

Referring with particularity to the drawing, the invention in its preferred embodiment contains a rotary shaft 10 centrally or axially fixed to one end of a driving spindle 11 of larger diameter. The driving spindle 11 has a rotary shaft 12 of smaller diameter at its other end. These three shaft members are in axial alignment with each other, and may be integrally constructed of one shaft, in which the terminal portions may be turned down on a cutting machine, one end shaft, namely the lower end 12 being of larger diameter and longer than the opposite end shaft 10.

The spindle 11 has at its lower portion, a cam follower shaft 13 set at right angles to the longitudinal axis of spindle 11. This shaft 13 extends through spindle 11 and has a counter weight 14 of any desired shape at one end thereof for dynamically balancing the spindle when rotated as hereinafter described.

The other end 15 of cam follower shaft 13 tapers slightly onto which is mounted a substantially frictionless cam follower 16 at the end 17. Shaft 13 has an opening at its tapered end for accommodating the end piece 17. Said end piece 17 may be countersunk into a bore in the tapered end of the shaft to retain the element 16 in position therein.

On the upper portion of driving spindle 11 is a scale 18 showing the direct values of the co-efficient of friction upon use of the device as will be further hereinafter described in detail.

In addition to the foregoing elements, I provide a driven housing 19 preferably of cylindrical shape with top and bottom spindle bearings 20 and 21, respectively, for maintaining spindle 11 in axial alignment in the housing. The housing 19 contains a cam groove 22 in which fits substantially frictionless cam follower 16. The housing 19 is rotatable and has at one end thereof the cam portion 22, and at the other end thereof a testing tip 28, to be hereinafter described.

The top bearing 20 is fixed to the upper part of the housing by means of projecting threaded pins or bolts 23 passing through openings in the top bearing plate. The plate is held in position by means of pins 23 screwed into the holes 24. The bearing plate 20 has an exteriorly threaded upper portion 25 for screwing thereon an interiorly threaded adjustable sleeve 26 for maintaining zero adjustment on the scale 18 of spindle 11. The lower portion of the spindle bearing 21 has an exteriorly threaded cylindrical extension 27. To this cylindrical extension is screwed a steel or other suitably resistant interchangeable testing tip 28 having a cylindrically hollow interior 29 axially coincident with driving spindle 11, for accommodating lower spindle shaft 12.

The exterior of said tip is cylindrically shaped, the upper portion 30 having its interior partly threaded for screwing onto extension 27 of bearing 21, and of larger diameter than the lower portion 31 thereof, thus affording a stronger basal portion onto which housing 19 is attached. This is advantageous since most of the torsional strain is on the testing tip when the device is used. At the bottom of testing tip 28, but set inwardly of the end thereof, is a cross piece plate 32 closing the interior 29 thereof. Depending from the cross plate is a center pin 33 in coincidence with the longitudinal axis of driving spindle 11. Said pin extends beyond the end 34 of testing tip 28 and is used for fixing the device against a surface such as a brake lining to be tested. Said end 34 makes frictional contact with the surface whose coefficient of friction is to be tested. This arrangement of a testing tip with a pin centrally located thereof enables a device to be used which is portable, since such device may be held in the hand and may be applied to any surface to be tested, the pin being essential to center the tip in its application to the surface being tested, and also for holding the parts in relative position to each other.

In the use of the device above described, the end of shaft 10 is connected to a driving mechanism (not shown) capable of rotation. The end 34 of the testing tip is placed against the surface of a brake lining, or other material to be tested. The device is pressed against the brake lining so as to form sufficient contact therewith and effect a turning movement of the housing. It is not material within wide limits to exert any excess pressure against the specimen being tested. When the driving mechanism is started, the driving spindle 18 is rotated and a certain amount of resistance, which is in proportion to the pressure of application, is offered to the rotary action of the spindle, because the test tip sets up a torsional reaction which can be translated directly in values of coefficient of friction on the scale 18 on spindle 11. As the spindle revolves, the housing and the testing tip are caused to revolve through the operation of the cam follower in the cam groove of the housing. In effect, the force of application of the end of the testing tip against the brake lining, and the torque reaction resulting between the housing and the spindle are indicated by the position of the cam follower in the cam, and this position indicates the co-efficient of friction which is shown on the scale on the driving spindle. The distance through which the cam follower 16 moves in cam 22 causes the spindle to extend from the housing or move in further, depending upon the amount of frictional resistances entailed between the surfaces.

When the device is in vertical position the spindle 11 carrying cam follower 16 tends to move downwardly in the housing 19, the spiral groove 22 in the housing acting as a guide for said cam follower. Upon upward or downward movement of the spindle 11 the different gradations on scale 18 are either exposed or hidden from view.

In the force diagram, shown in Fig. 3, the vertical leg represents the force of application (P) to the surface of a product to be tested, while the base of the triangle in the diagram indicates the force necessary to maintain uniform velocity (F). The hypothenuse represents the resultant (R) of the two forces P and F and its angle $\theta$ with the vertical or Y axis is the angle whose tangent is equal to the ($\mu$) co-efficient of friction. The broken line, $ab$, at right angles to the resultant (R) makes the angle $\theta$ with the X axis, and being normal to the resultant (R), has no (R) components.

In the force diagram, Fig. 4, the vertical and horizontal forces, P and F respectively, are shown together with the resultant (R) and the broken line ($ab$) at right angles or normal to the resultant (R). The cam contour ($cd$) is shown tangent to the line ($ab$) at the point of intersection of the resultant (R); and the cam follower (A) tangent to the cam contour ($cd$) and the line ($ab$), also at the point of intersection of the resultant (R). It will be appreciated that when the cam follower comes to rest on the cam surface and the sleeve 19 is rotating at uniform velocity, the force tending to resist the rotary movement of the sleeve on the surface to be tested is exactly balanced by the force tending to rotate the sleeve so that the resultant (R) at this moment has no components effective to cause the cam follower (A) to move along the cam contour ($cd$). If, however, in any diagram of forces such as shown in Fig. 4, the resultant R of the forces P and F is not at right angles with the line $ab$ at the point of tangency of the circle A with the cam contour $cd$, then the force tending to resist rotation of the sleeve 19 is not balanced against the driving force F and, consequently, until such balance of forces obtains, the cam follower will continue to shift along the cam contour, coming to rest at a point at which the resultant of the forces acting to press the friction surface against the surface to be tested and to rotate the friction surface of the driven member, is at substantially right angles to the slope of the cam contour. By selecting points on the Y axis corresponding to desired values of the co-efficient of friction ($\mu$), the cam contour ($cd$) may be readily plotted for any ranges of co-efficient of friction ($\mu$) desired. This co-efficient of friction heretofore shown is considered equal to one when the force necessary for motion of uniform velocity (F) equals the force of application (P).

When shown as a force diagram, the ordinates along the Y axis represent the force of application (P), and the abscissas along the X axis represent the force necessary to maintain motion of uniform velocity (F). If a line were drawn diagonally connecting the abscissa and ordinates, a right angle triangle would be formed, the hypothenuse of which would represent in direction and intensity the resultant (R) of the two forces (P) and (F). It should be noted that, with a definite value for the co-efficient of friction, $\mu$ the intensity of the force necessary to maintain motion of uniform velocity (F) is always proportional to the force of application (P), and therefore the direction of the resultant force (R), does not vary with the intensity of (F) and (P). It is therefore established that for each value of the coefficient of friction $\mu$ there is corresponding definite direction of the resultant (R), and the angle ($\theta$) which the resultant (R) if prolonged, makes with the Y axis is the angle whose tangent is $$\frac{F}{P}$$

and inasmuch as $$\frac{F}{P}$$

is also equal to the co-efficient of friction $\mu$ it follows therefore that the angle ($\theta$) is the angle whose tangent is equal to the co-efficient of friction $\mu$, as follows:

$$\tan \theta = \frac{F}{P} = \mu$$

In past practice, it has been the custom to determine the co-efficient of friction $\mu$ by measuring, individually, the force necessary to maintain motion of uniform velocity (F) and the force of application (P), and then divide the former, (F), by the latter, (P), but I propose to measure the co-efficient of friction ($\mu$) by directly measuring the direction of the resultant (R) of the two forces (F) and (P).

The invention embodies this principle in that in the device proposed to measure the co-efficient of friction between two materials, one of these materials is integral with the device which is applied to the second material. Thus the force of application (P) is furnished by the operator pressing the device against the material to be tested, and the force necessary to maintain motion of uniform velocity is furnished by an external driving mechanism (not shown) which furnishes motion of rotation rather than of translation. The direction of the resultant force (R) (the angle $\theta$) is to be measured by applying the force of application (P) and the externally applied force of rotation to a frictionless cam follower which is in contact with a cam of varying slope, whose rotational movement is opposed by the force necessary to maintain uniform velocity (F) in such a way that the cam follower will roll along the cam until it reaches that point on the cam whose slope is normal (at right angles) to the resultant (R). When the cam follower reaches this point of the slope, the force transmitted from the follower to the cam will be radial in direction from the center of the cam follower to its contact point with the cam, and there will therefore be no effective components tending to move the follower on the cam to a different point of slope.

To complete the device, it is therefore only necessary to provide means for indicating the slope of the cam at the point the follower has come to rest when testing any particular combination of materials, as the slope of the cam at that point is fixed for any value of co-efficient of friction ($\mu$) and the differential of the Y axis increment ($dy$) with respect to the X axis increment ($dx$) is equal to the angle whose tangent is the force required to maintained uniform velocity (F) divided by the force of application (P), which is equal to the co-efficient of friction ($\mu$).

$$\frac{dy}{dx} = \tan \theta = \frac{F}{P} = \mu$$

The invention is not limited to the testing of automobile brake linings in the various fields of service, maintenance, engineering, factory production, shipping and receiving inspection, since many other materials, whose frictional value or lack of frictional value is of importance may as readily be tested, such as clutch facings, belting, tires, floors, pavements, etc., in fact any substance whose friction or lack of friction is to be ascertained.

From the foregoing preferred embodiment taken in connection with the attached drawing, it will be seen that there are provided relatively rotatable bodies, the housing with its testing tip making contact with the surface of the body to be tested, and a spindle shaft inside the housing having a movement either in or out of the housing. The movement of this shaft is limited by a cam follower in a cam groove in the housing. As the spindle shaft is rotated by means of driving mechanism, resistance is offered by the housing, since the testing tip on the latter is in frictional contact with a surface to be tested. The resistance of the housing to the force applied by the driving spindle shaft causes said spindle to move upwardly or downwardly of the housing, since the cam follower is movable in the cam. While the resultant movement of the driving spindle is lengthwise, it is to be noted however that there is a spiral movement because of the geometric contour or curvature of the cam. A cam of proper geometric curvature may be used in order to obtain the desired result. As the rotation of the device is continued at uniform angular velocity, there will be a balancing of the cam follower in the cam, in which case the reading on the scale is taken directly as the co-efficient of friction of the surface as tested.

The shaft or driving spindle can be readily applied to any hand drill or drill press. The annuli of scale 18 may be differently colored to quickly indicate the co-efficient, according to a chart, if desired. Other indicating means of any suitable and known kind may be applied, as a movable pointer passing over a scale, etc. Testing tips may be altered in material and shape to measure the co-efficient of friction of various combinations of materials. A test, when made, does not injure the materials tested. Varied curvatures of the cam may be used to get the most accurate readings of the particular materials being tested, viz: cam may be shaped to read from 0 to 1.0 co-efficient of friction, as now shown in Fig. 2 of the drawing, or the whole scale may be devoted (by changing the shape of the cam) to read co-efficients of friction from 0.5 to 0.6 with the corresponding subdivisions.

While I have described one preferred form of my invention, it is to be understood that various changes may be made as to the form, use of material and arrangement of parts without departing from the spirit and scope of my invention.

I claim:

1. A friction tester comprising a driven member adapted for contact with a surface to be tested, and whose motion is opposed by the frictional resistance offered by said surface, a driving member acting on said driven member, for exerting a force of application on the driven member substantially perpendicular to said surface to press the driven member against the surface to be tested, and for simultaneously exerting a driving force on said driven member substantially parallel to the surface to be tested and in an amount sufficient to drive the driven member at substantially uniform velocity, and a movable connection between the driving and driven members, said connection including means for relatively varying the componential forces acting through the driving member on the driven member in accordance with the frictional resistance offered by the surface being tested to movement of the driven member thereon, until the resultant of said forces is substantially balanced by the resultant of the forces tending to resist movement of said member, and said driven member is moving at substantially uniform velocity on the surface being tested.

2. A friction tester comprising a driven member adapted for contact with a surface to be tested, and whose motion is opposed by the frictional resistance offered by said surface, a driving member acting on said driven member, for exerting a force of application on the driven member substantially perpendicular to said surface to press the driven member against the surface to be tested, and for simultaneously exerting a driving force on said driven member substantially parallel to the surface to be tested and in an amount sufficient to drive the driven member at substantially uniform velocity, and a movable connection between the driving and driven members, said connection including an inclined bearing surface of varying slope on which the driving member rests and over which it shifts in response to variations in the frictional resistance offered by the surface being tested to movement of the driven member thereon, said bearing surface having sufficient inclination to cause the driving member to come to rest thereon when the velocity of the driven member on the test surface is substantially uniform and at a point where the resultant of the forces acting through the driving member on the driven member is substantially perpendicular to the slope of said bearing surface.

3. A friction tester comprising a driven member adapted for contact with the surface to be tested and whose motion is opposed by the frictional resistance offered by said surface, a driving member acting on said driven member for exerting a force of application on the driven member substantially perpendicular to said surface to press the driven member against said surface and for simultaneously exerting a driving force on said driven member substantially parallel to the surface to be tested and in an amount sufficient to drive the driven member at a substantially uniform velocity, and a movable connection between the driving and driven members including a cam having a variable slope and a cam follower, said cam follower being movable over the cam to change the angle of application of force to the driven member in accordance with the frictional resistance offered by the surface being tested to movement of the driven member thereon, said cam follower coming to rest on said cam when the resultant of the forces acting on the driving member is substantially perpendicular to the slope of the cam and the driven member is moving at substantially uniform velocity, and means for indicating said point.

4. A friction tester comprising a rotatable driven member adapted for contact with the surface to be tested and whose motion is opposed by the frictional resistance offered by said surface, a rotatable driving member movable axially relatively to the driven member and acting on said driven member for exerting a force of application on the driven member substantially perpendicular to the surface to be tested to press the driven member against said surface and for simultaneously exerting a driving force on said driven member substantially parallel to the surface to be tested and in an amount sufficient to drive the driven member at a substantially uniform velocity, and a movable connection between the driving and driven members including a helical cam of varying slope and a cam follower, said cam follower being movable over the cam to change the angle of application of force to the driven member in accordance with the frictional resistance offered by the surface being tested to movement of the driven member thereon, said cam follower coming to rest on said cam when the resultant of the forces acting on the driven member from the driving member is substantially perpendicular to the slope of the cam, and is substantially balanced by the resultant of the forces tending to resist the movement of the driven member on the surface being tested.

5. In a surface friction tester, a member adapted to be moved upon a surface to be tested and having a cam surface of varying slope adapted to be acted upon by applied forces always at right angles to each other, and a force applying member contacting substantially frictionlessly with said surface for applying forces at right angles to each other thereto, the point of contact between said cam surface and said force applying member shifting in respect to each other under the reaction due to resistance to movement of the driven member upon the surface to be tested until the resultant of the applied forces coincides with and balances the resultant of the opposed forces and is substantially perpendicular to the slope of the cam, at which point the force applying member comes to rest on said cam surface when the velocity of said member is substantially uniform.

6. In a surface friction tester, a member mounted for rotation and movement longitudinally of the axis of rotation, a second member mounted to be rotated and to be moved relatively axially of the first member, the axes of the first and second members being coincident, one of said members having a cam surface of varying slope, and the other member having a follower movable substantially frictionlessly upon said cam of the other member, said two members being adapted to be rotated and adapted to be moved axially of each other until the cam follower reaches a point on the cam wherein the resultant of the rotary and axial forces of one member coincides and exactly balances the resultant of the reactive rotary and axial forces of the other member, and means for indicating said point.

7. In a surface friction tester, comprising an axially movable housing having a cam of varying slope and having a surface adapted to be applied to the surface of the material being tested, a shaft within the housing having its axis in coincidence with the axis of the housing and adapted to be rotated, a substantially frictionless follower upon the shaft adapted to ride upon the sloping cam surface, and adapted to rotate the housing, said housing and shaft moving relatively axially of each other during the rotation of the housing and shaft until the cam follower reaches a point on the cam surface wherein the resultant of the forces acting upon the follower exactly balances the resultant of the forces acting upon the cam surface at the point of contact with the follower, and indicator means by which the position of the shaft in respect to the housing indicates the coefficient of friction of the surface being tested.

8. A device for testing friction, comprising a driving spindle with a scale denoting directly the values of coefficient of friction thereon, a cam follower in connection with said spindle, a housing for said spindle having a cam surface engaged by the follower on the spindle, the cam and follower being interconnected to move the housing and spindle axially relatively to each other, and a surface contacting tip connected to the housing for bearing against a surface to be tested, whereby upon the application of external forces to said spindle to impart rotary movement thereto the contacting tip is pressed against the surface to be tested and the housing is rotated, the difference in rotation between the housing and the spindle due to the frictional resistance offered by said surface causing axial movement of the spindle which is directly readable in terms of coefficient of friction on the scale.

9. In a friction tester, a movable member having a friction surface adapted to contact a surface to be tested, said member having an inclined cam surface, the slope of which gradually increases from one end to the other, force applying means movably engaging said cam surface and operating to move the movable member over the surface to be tested and to press the said member against said surface, said force applying means moving along said cam surface when force is applied thereto until the movable member is moving at a uniform velocity over the surface to be tested, and means for indicating the position of the point of engagement of the force applying means and the inclined cam surface under such conditions.

10. In a friction tester, a movable member having a friction surface adapted to contact a surface to be tested, said member having an inclined cam surface, the slope of which gradually increases from one end to the other, means movably engaging said cam surface for subjecting the movable member to horizontal and vertical components of force tending respectively to move the movable member over the surface to be tested and to press the said member against said surface, said means moving along said cam surface when force is applied thereto until the resultant of the horizontal and vertical forces acting upon the movable member becomes perpendicular to the slope of the cam surface at the point of engagement of said means therewith, and means for indicating such point.

11. In a friction tester, a cylindrical member having a friction surface for contacting a surface to be tested, and a helical cam surface in its cylindrical wall, the slope of which varies from a minimum at one end to a maximum at the other end, a shaft member telescopically engaged with and movable axially of and rotatable with respect to the cylindrical member and having a cam follower engaged with the cam surface, and means for rotating the shaft, said cam follower operating on the cam to rotate the cylindrical member, and moving along the cam surface until the point of contact between the cam follower and cam surface reaches a point where the resultant of the forces acting on the cam follower is normal to the slope of the cam, and means for indicating when the follower has reached this point.

12. In a force measuring device, two members interconnected for relative axial and rotational movements, one of said members having an inclined cam surface, the slope of which increases from one end to the other, the other of said members having a cam follower bearing on said cam surface and movable thereover, means whereby force may be applied to one of said members tending to relatively shift said members axially and rotationally to cause the cam follower to shift over said cam surface as said members move relatively axially and rotationally, until the resultant of the applied forces is perpendicular to the slope of the cam and the two members are rotating at uniform velocity, and means for indicating the extent of relative axial movement of said members.

13. In a friction tester, a rotatable member, a cam at one end thereof through which the member is actuated, and a testing tip at the other end thereof.

14. In a friction tester, an axially rotatable testing tip having a friction surface and a pin centrally disposed in respect thereto, the pin extending beyond the friction surface and adapted to engage the surface to be tested.

15. In a friction tester, an axially rotatable testing tip having an annular flange provided with a friction surface, and a pin centrally disposed in respect thereto, the pin extending beyond the friction surface, the friction surface being perpendicular to the axis of the pin, and said pin being adapted to engage the surface to be tested.

16. In a friction tester, a rotatable testing tip having an annular friction surface of known characteristics, and means concentric of said surface for defining the axis of rotation of said tip with respect to the material being tested, said means extending beyond the friction surface, adapted to engage the surface to be tested.

SYDNEY G. TILDEN.